(12) United States Patent
Holoch et al.

(10) Patent No.: US 8,256,285 B2
(45) Date of Patent: Sep. 4, 2012

(54) FLOW SENSOR INCLUDING A BASE MEMBER WITH A RESILIENT REGION FORMING A FLOW CHANNEL AND A COVER MEMBER COVERING THE FLOW CHANNEL

(75) Inventors: Philip Holoch, Weisslingen (CH); Karin Megnet, Ruti (CH); Curdin Staheli, Wetzikon (CH)

(73) Assignee: BELIMO Holding, AG, Hinwil (CH)

( * ) Notice: Subject to any disclaimer, the term of this patent is extended or adjusted under 35 U.S.C. 154(b) by 324 days.

(21) Appl. No.: 12/674,109

(22) PCT Filed: Aug. 20, 2008

(86) PCT No.: PCT/EP2008/060903
§ 371 (c)(1),
(2), (4) Date: Feb. 18, 2010

(87) PCT Pub. No.: WO2009/024589
PCT Pub. Date: Feb. 26, 2009

(65) Prior Publication Data
US 2011/0036162 A1    Feb. 17, 2011

(30) Foreign Application Priority Data
Aug. 21, 2007    (EP) .................................. 07405244

(51) Int. Cl.
*G01F 1/68* (2006.01)
(52) U.S. Cl. .................................. 73/204.22
(58) Field of Classification Search .................. None
See application file for complete search history.

(56) References Cited

U.S. PATENT DOCUMENTS

| | | | |
|---|---|---|---|
| 5,385,046 A * | 1/1995 | Yamakawa et al. | 73/514.03 |
| 6,782,745 B1 * | 8/2004 | Zurek et al. | 73/204.22 |
| 7,765,865 B2 * | 8/2010 | Ike et al. | 73/204.22 |
| 7,793,410 B2 * | 9/2010 | Padmanabhan et al. | 29/832 |
| 2002/0194909 A1 | 12/2002 | Hasselbrink, Jr. et al. | |
| 2004/0163462 A1* | 8/2004 | Zurek et al. | 73/204.22 |
| 2004/0197843 A1 | 10/2004 | Chou et al. | |
| 2006/0210445 A1 | 9/2006 | Osterfeld et al. | |

FOREIGN PATENT DOCUMENTS

| | | |
|---|---|---|
| EP | 1182432 A2 | 2/2002 |
| EP | 1500935 A1 | 1/2005 |
| EP | 1710016 A2 | 10/2006 |
| WO | 02/12734 A1 | 2/2002 |
| WO | 2004/024326 A1 | 3/2004 |
| WO | 2004/089546 A2 | 10/2004 |

OTHER PUBLICATIONS

Holger Becker, et al., "Polymer microfluidic devices," Talanta, Feb. 11, 2002, pp. 267-287, vol. 56, No. 2.

* cited by examiner

*Primary Examiner* — Harshad R Patel
(74) *Attorney, Agent, or Firm* — Sughrue Mion, PLLC

(57) ABSTRACT

A flow sensor (1) comprising a flow channel (14) embedded in a base body (1'), a flow sensor element (13) adjacent to the flow channel (14) and a cover plate (12) covering the flow channel (14) and arranged on the base body (1'). The flow channel (14) is formed by an elastic sealing lip (15) which delimits the channel (14), running on and around an upper side of the base body (1') lying opposite the cover plate (12) such that a seal is formed. This arrangement allows the formation of a sealed structure where a flow channel (14) with a level channel that avoids contamination and turbulence and has laminar current flowing through the flow channel (14).

13 Claims, 9 Drawing Sheets

FLOW SENSOR INCLUDING A BASE MEMBER WITH A RESILIENT REGION FORMING A FLOW CHANNEL AND A COVER MEMBER COVERING THE FLOW CHANNEL

CROSS REFERENCE TO RELATED APPLICATIONS

This application is a National Stage of International Application No. PCT/EP2008/060903 filed Aug. 20, 2008, claiming priority based on European Patent Application No. 07405244.0, filed Aug. 21, 2007, the contents of all of which are incorporated herein by reference in their entirety.

FIELD OF THE INVENTION

The present invention relates to a flow sensor and to a method for the production of the flow sensor, in particular a flow sensor for measuring the flow of fluids, in particular for measuring the flow of air and other gases. The present invention relates in particular to a flow sensor, and to a method for the production of the flow sensor, which comprises a base member with a flow channel, a flow sensor element adjoining the flow channel, and a cover plate arranged on the base member and covering the flow channel.

BACKGROUND OF THE INVENTION

EP 1 182 432 describes a flow sensor consisting of two housing parts for measuring the flow of fluids, which flow sensor comprises a semiconductor chip with sensor arrangement arranged between the housing parts. The semiconductor chip is located at a measuring channel configured as a groove in one of the housing parts. A sealing ring is additionally arranged between the housing parts. A strip conductor foil is guided outwards from the semiconductor chip between the sealing ring and the other one of the housing parts. Although the measuring channel is sealed by the sealing ring relative to the outside in the region of the gap between the housing parts, the measuring channel is not sealed relative to the gap between the housing parts.

A further flow sensor is described by Gruner A G, Bürglestrasse 15-17, 78564 Wehingen, Germany, this one consisting of two parts and a semiconductor sensor element. A measuring channel is again formed between the two parts, in which the sensor element is inserted. The two parts are adhesively bonded directly together, such that the measuring channel is for the most part sealed off from the gap between the two parts. It is however scarcely possible to achieve perfect sealing off of the measuring channel from the gap between the parts and at the same time completely to prevent penetration of adhesive into the measuring channel.

As a result of connections between the measuring channel and the gap between the housing parts and as a result of glue deposits in the measuring channel, dirt may accumulate, which may cause turbulent flow through the measuring channel and thus impair flow measurement quality.

US 2006/210445 A1 discloses a sensor comprising microfluidic channels, having lateral sealing lips made of resilient material. By arranging different microfluidic channels next to one another a high aspect ratio may be achieved.

SUMMARY OF THE INVENTION

It is an object of the present invention to provide a flow sensor and a method for the production of the flow sensor which do not display at least certain of the disadvantages of the prior art. It is in particular an object of the present invention to provide a flow sensor and a method for the production of the flow sensor which allow the flow rate to be measured by means of a flow sensor element in a flow channel, which latter is less susceptible to the deposition of dirt particles in the flow channel.

The flow sensor comprises a base member with a flow channel, a flow sensor element adjoining the flow channel, and a cover plate arranged on the base member and covering the flow channel.

The above-stated aims are achieved by the present invention in particular in that the flow channel is formed by a sealing lip, which surrounds and defines the flow channel on the top of the base member and is pressed sealingly against the cover plate. Unlike the prior art, a gap between the base member and the cover plate is accordingly not sealed off from the outside world, but rather by configuring the flow channel by means of the sealing lip the flow channel itself is sealed off from possible gaps between the base member and the cover plate and thus also from the outside world. On the top of the base member, the sealing lip preferably forms a flow channel taking a repeatedly meandering path, whereby a larger length of flow channel can be obtained over a small surface, which is conducive to laminar flow. The sealing lip additionally seals the flow channel relative to the cover plate, such that the sealing lip and cover plate form a flow channel with a flat channel bed on the top of the base member, which flow channel comprises smooth defining surfaces and a constant cross-section and which as far as possible prevents deposition and accumulation of dirt particles and, if applicable, prevents the penetration of adhesives into the flow channel when the cover plate is attached to the base member. In this way, undesired turbulence may be prevented in the flow channel and laminar flow through the flow channel may be brought about.

In this case, the base member is formed of a first and a second region, which consist in each case of a different material and are joined together, wherein the flow channel is formed in the first region, which consists of a significantly more resilient material than the second region. The two regions are preferably produced by the two component injection molding method and preferably form a material composite. By forming the flow channel in the resilient material region, the sealing lip is resilient and formed in one piece with the channel bed. The second region is configured in such a way that a surface plane is obtained which is defined relative to a channel bed of the flow channel and which lies between the plane of the channel bed and the sealing lips projecting therebeyond, such that at all points of the sealing face between cover plate and sealing lip a predetermined sealing force arises, which may be achieved in a simple, well-defined manner.

In one variant embodiment the base member comprises ports formed in the second, nonresilient region for a flow medium, preferably air or other gases. The ports are in each case connected to one of the ends of the flow channel via a bore.

In a further preferred variant embodiment the flow sensor element is set into the cover plate over the flow channel and, with the cover plate, forms a substantially flat ceiling for the flow channel. Because the flow sensor element is set flush into the cover plate and, with the cover plate, forms a flat ceiling for the flow channel, turbulence and thus the deposition and accumulation of dirt particles are in turn prevented at the transition between cover plate and flow sensor element.

In a further variant embodiment, when the cover plate is removed the sealing lip is tapered at the end remote from the top of the base member. That is to say, the sealing lip is tapered at the end which is pressed resiliently against the cover plate when the cover plate is attached to the base member. As a result of the taper of the sealing lip, the resilient deformation of the sealing lip brought about by the pressing on of the cover plate can be compensated in such a way that, when the cover plate is attached, a substantially rectangular cross-section of the flow channel is formed, which does not display any significant deformation at the side walls of the flow channel formed by the sealing lip.

In a further variant embodiment, the flow channel is formed on a channel bed on the top of the base member in such a way that the flow channel is separated in cross-section in each case laterally from an outer channel surrounding the flow channel by the sealing lips projecting upwards from the channel bed. In other words the sealing lip is arranged in such a way on a channel bed that the channel bed is separated into three regions by the sealing lip when viewed in cross-section: the flow channel arranged centrally on the channel bed and two outer channels, which are separated in each case from the flow channel by the sealing lip. The outer channels for example allow the accommodation of a surplus of adhesives optionally used to attach the cover plate to the base member without interfering with the flow channel, or of surplus sealing lip material. It should be noted that elastomers cannot be made smaller in volume, but rather can merely be displaced to another location.

The present invention additionally relates to a method for the production of the flow sensor, in which method a base member with a flow channel is provided, a flow sensor element is arranged adjacent the flow channel, the flow channel is covered by attaching a cover plate to the base member, and the base member is provided by means of injection molding in such a way that a sealing lip is formed on the top of the base member opposite the cover plate, which sealing lip surrounds and defines the flow channel on the top of the base member and presses sealingly against the cover plate when the cover plate is attached to the base member. The flow sensor with the above-cited advantages of low susceptibility to soiling and laminar flow through the flow channel may thus be efficiently and inexpensively produced, by simply attaching the cover plate with flow sensor element set in flush to the base member produced by injection molding. In this case, the base member is formed by two-component injection molding with a first and a second region, which consist in each case of a different material and are joined together, wherein the flow channel is formed in the first region, which consists of a significantly more resilient material than the second region.

BRIEF DESCRIPTION OF THE DRAWINGS

An embodiment of the present invention is described below by way of example. The exemplary embodiment is illustrated by the following appended figures.

DESCRIPTION OF PREFERRED EMBODIMENTS

Figure 1:
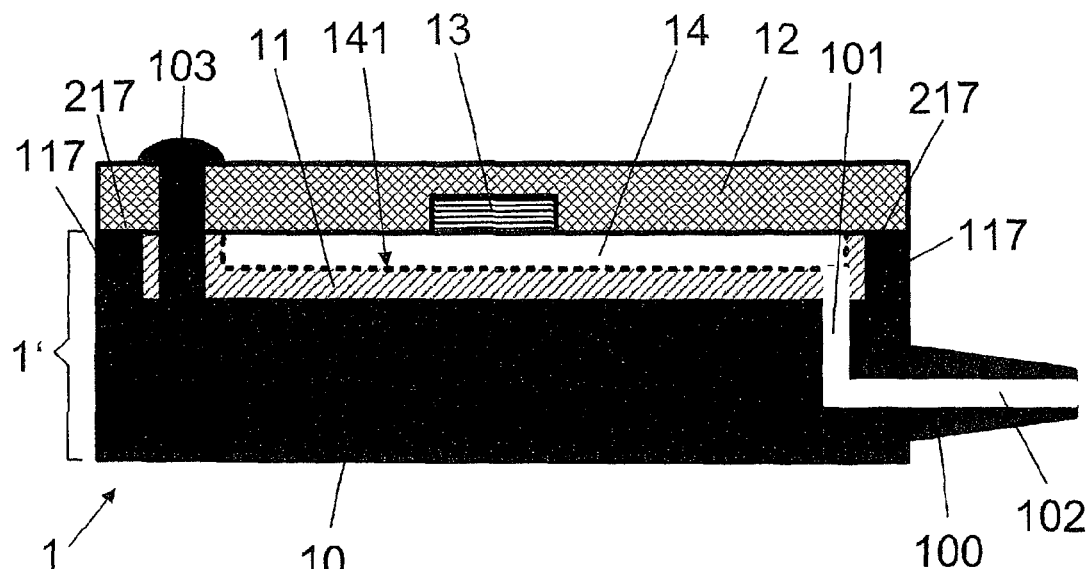
FIG. 1 shows a cross-sectional diagram, which schematically represents a cross-section through a flow sensor, which comprises a base member with ports and flow channel and a cover plate with a flow sensor element.

In FIGS. 1, 3a, 3b, 3c and 3d reference numeral 1 designates a flow sensor for measuring the flow of fluids, preferably of air or other gases. As is shown schematically in FIG. 1, the flow sensor 1 comprises a cover plate 12 and a base member 1', which is also represented in various variant embodiments in FIGS. 2, 5, 7a and 7b. The cover plate 12 is mounted on the base member 1' and attached to the base member 1', for example by means of rivets 103, screws, adhesive or by welding. The cover plate 12 is for example a flat electronic epoxy printed circuit board.

The base member 1' comprises a nonresilient region 10 and a resilient region 11 joined thereto. The resilient region 11 is arranged lying on the nonresilient region 10. The nonresilient, or at least substantially less resilient, harder region 10 compared with resilient region 11 consists for example of a plastics such as nylon polyamide. The resilient (softer) region 11 consists for example of a thermoplastic material, for example a polyethylene-based material. The base member 1' is preferably produced using the two-component injection molding method. In the two-component injection molding method, the resilient and nonresilient regions 10, 11 are joined together for example via a material bond or at least interlockingly. In a less preferable variant embodiment the resilient region 11 and the nonresilient region 10 are produced as separate parts, for example as base plate and channel plate, which are joined together, for example by adhesive bonding.

Figure 2:
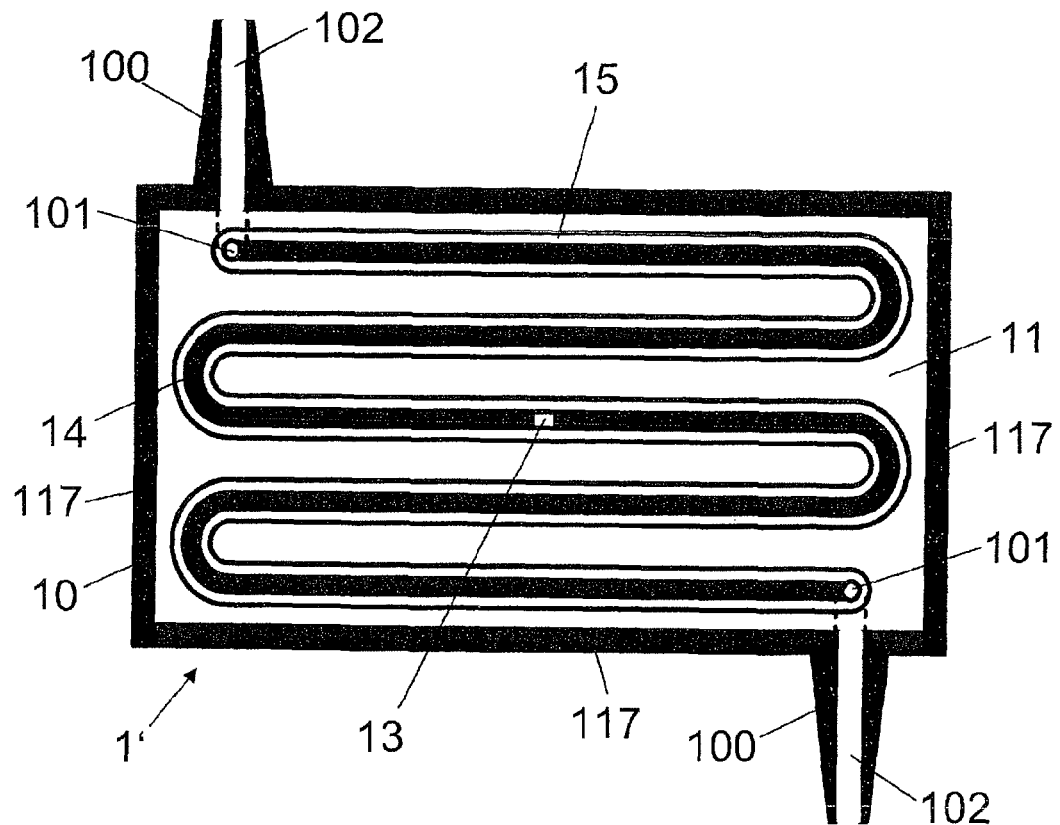
FIG. 2 shows a plan view diagram, which schematically represents a plan view of the base member without cover plate attached thereto, comprising ports and a flow channel joined thereto and formed by sealing lips.
Figure 3A:
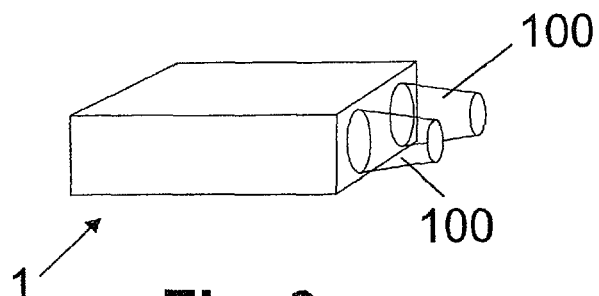
FIGS. 3a, 3b, 3c and 3d show different variant embodiments of the flow sensor with differently arranged ports.
Figure 3B:
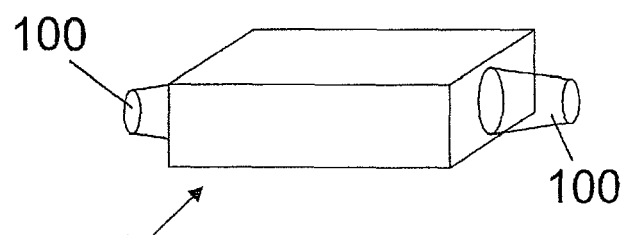
Figure 3C:
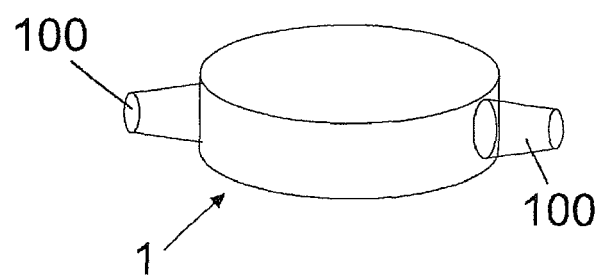
Figure 3D:
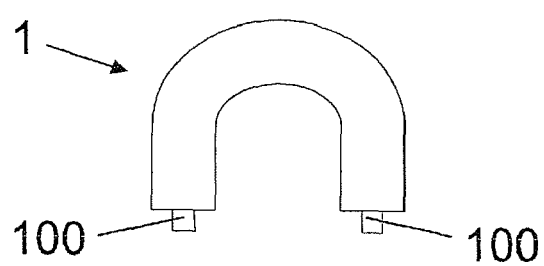
Figure 5:
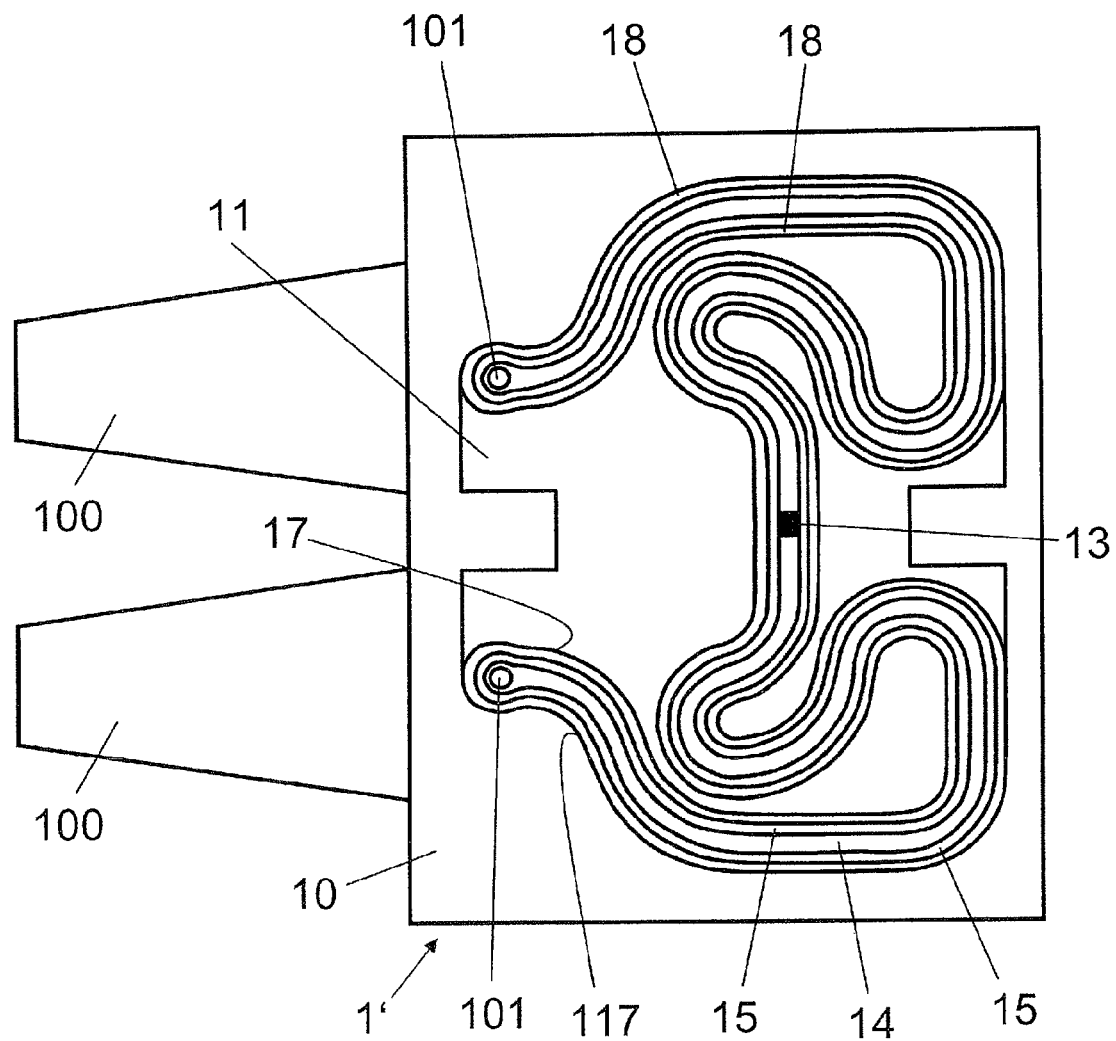
FIG. 5 shows a plan view diagram, which schematically represents a further plan view of the base member without cover plate attached thereto, comprising ports and a flow channel joined thereto and formed by sealing lips.

As shown in FIGS. 1, 2 and 5, the nonresilient region (the base plate) comprises two ports 100 for supplying and removing the flow medium. The ports 100 are preferably constructed for the attachment of hoses, which have an internal diameter of 6 mm for example. The ports 100 are of conical configuration and are provided with radial ribs, for example. The ports 100 comprise an internal bore 102 with a diameter of approx. 0.5 mm.

FIGS. 3a, 3b, 3c and 3d show examples with various arrangements of the ports 100. In the preferred embodiment according to FIG. 3a the flow sensor 1 is of cuboidal configuration and the ports 100 are arranged next to one another on the same side (for example end face) of the cuboid. In the embodiment according to FIG. 3b the flow sensor 1 is of cuboidal configuration and the ports 100 are arranged on different sides of the cuboid, for example on opposing sides along a common axis. In the embodiment according to FIG. 3c the flow sensor 1 is of cylindrical configuration and the ports 100 are arranged opposite one another along a common axis. In the embodiment according to FIG. 3d the flow sensor 1 is of U-shaped configuration and the ports 100 are in each case arranged at one of the two ends of the U shape (horseshoe).

As is shown in FIGS. 1, 2, 5, 7a and 7b, the resilient region 11 (the channel plate) comprises a flow channel 14. The flow channel 14 comprises a flat channel bed 141 with a smooth surface and is covered by the cover plate 12 arranged parallel to the channel bed 141. As is apparent in FIGS. 2 and 5, the flow channel 14 meanders repeatedly between its two ends. At its two ends the flow channel is in each case joined by a bore 101 to the internal bore 102 of one of the ports 100. The bores 101 extend from the channel bed 141 through the resilient region 11 and the nonresilient region 10 to the internal bores 102 of the ports 100 and are arranged for example perpendicularly to the channel bed 141 and to the internal bores 102.

Figure 4A:
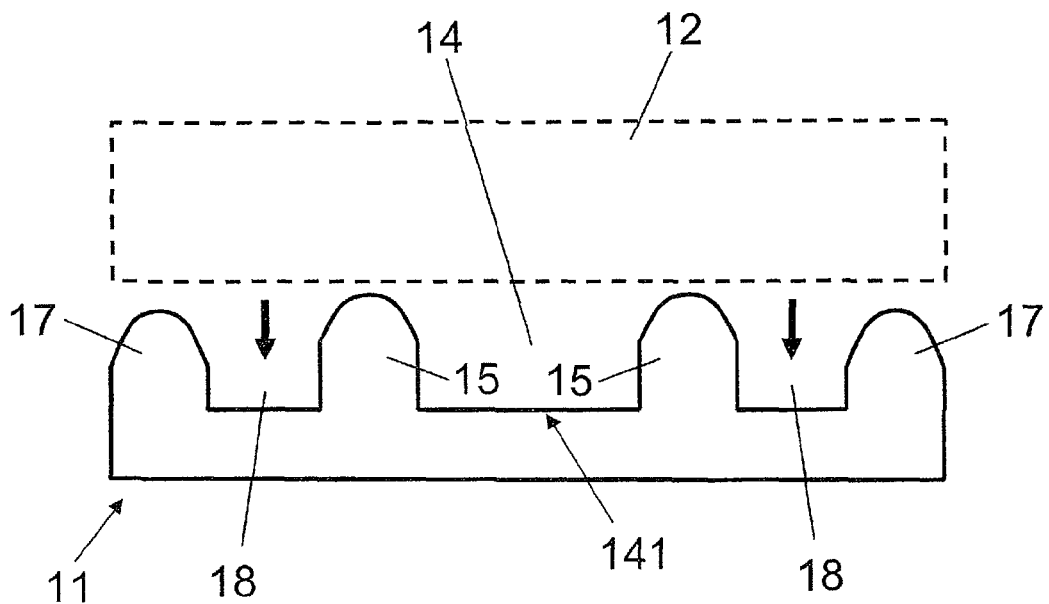
FIG. 4a shows a cross-sectional diagram, which schematically represents a cross-section through a region of the flow channel across the flow direction, with the cover plate not as yet attached to the base member.
Figure 4B:
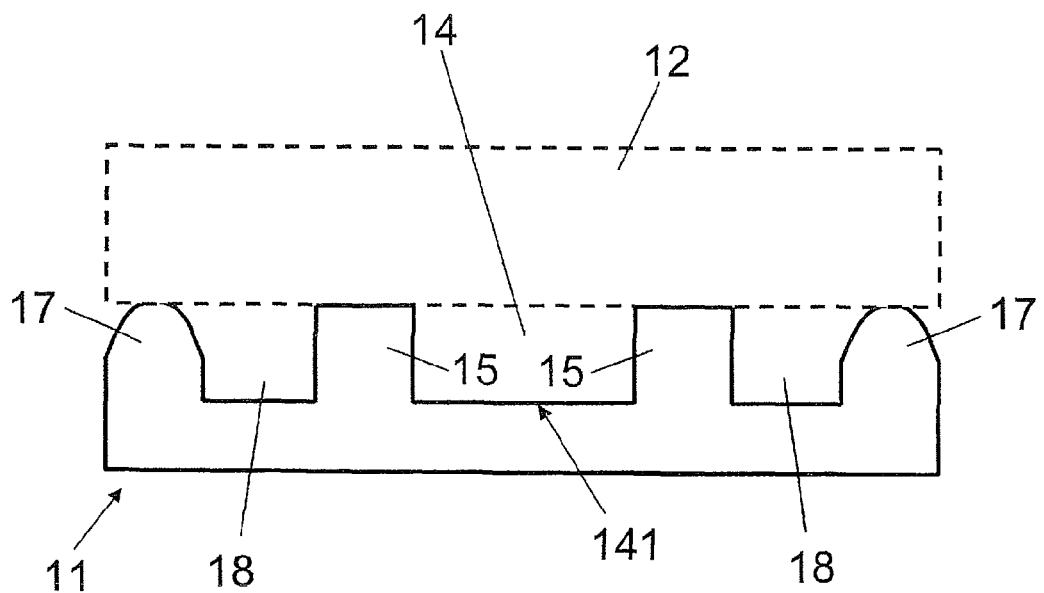
FIG. 4b shows a cross-sectional diagram, which schematically represents a cross-section through the region of the flow channel across the flow direction, with the cover plate mounted on the base member.
Figure 4C:
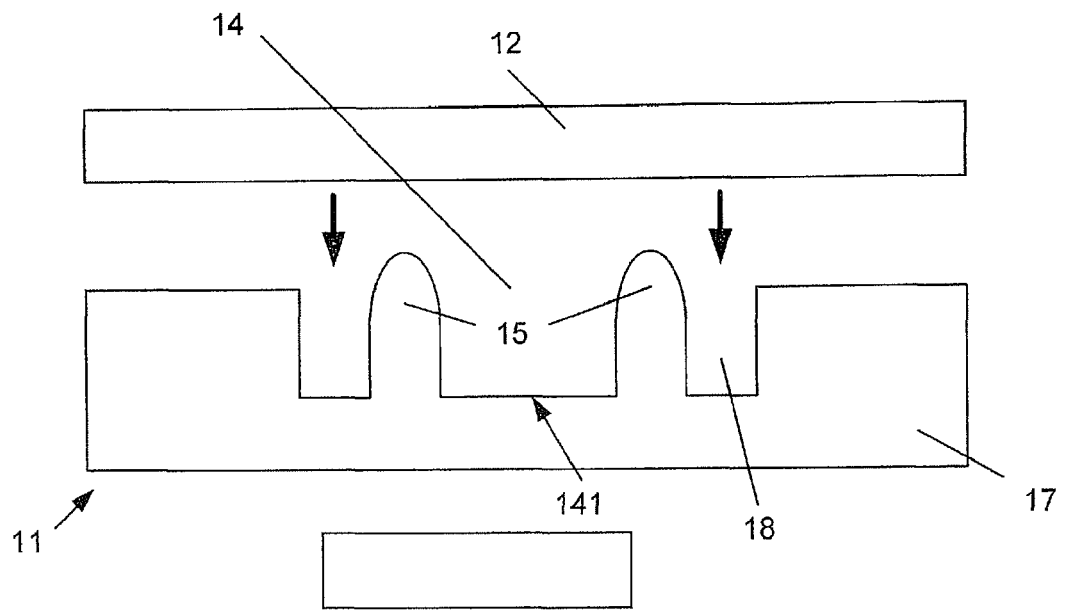
FIG. 4c shows a cross-sectional diagram, which schematically represents a cross-section through a region of the flow channel according to a further variant embodiment across the flow direction, with the cover plate not as yet attached to the base member.
Figure 4D:
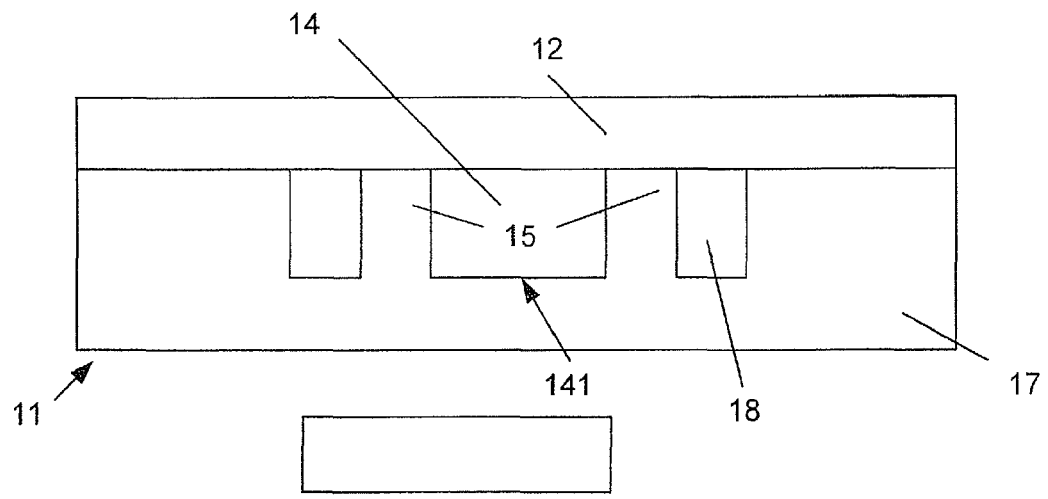
FIG. 4d shows a cross-sectional diagram, which schematically represents a cross-section through the region of the flow channel according to the further variant embodiment across the flow direction, with the cover plate mounted on the base member.

As is shown in FIGS. 2, 4a, 4b, 4c, 4d, 5, 7a and 7b, the resilient region 11 comprises a sealing lip 15, which is arranged upright on the channel bed 141 and extends from the channel bed 141 to the cover plate 12. The flow channel 14 is formed by the sealing lip 15, which surrounds the channel bed 141 of the flow channel 14 and defines the sides of the flow channel 14 on the channel bed 141 in the flow direction. As is shown in FIGS. 4a and 4c in cross-section across the flow direction of the flow channel 14, the sealing lip 15 is tapered at the end remote from the channel bed 141, when the cover plate 12 has not as yet been mounted on the base member 1'. Once the cover plate 12 has been mounted on the base member 1', the sealing lip 15 is compressed, as illustrated schematically in FIGS. 4b, 4d, and the sealing lip 15 seals the flow channel 14 relative to the cover plate 12. The cover plate 12, the channel bed 141 and the sealing lip 15 in each case have smooth surfaces and form boundary surfaces, which form the flow channel 14 and define a constant, preferably rectangular cross-section. The cross-section of the flow channel 14 has a depth of 0.3 mm and a width of 0.8 mm, for example. The length of the flow channel 14 amounts for example to 100 mm. Thus, the flow channel 14 has a length which is large relative to its cross-section, for example the ratio of length to width or length to depth of the flow channel 14 ranges from approximately 100:1 to 400:1. The Reynolds number of the flow channel 14 amounts to approximately 50, which brings about turbulence- and eddy-free laminar flow.

In the variant embodiments according to FIGS. 4a, 4b, 4c, 4d and 5, the flow channel 14 formed by the sealing lip 15 is surrounded by an outer channel 18, which is defined by the edges 17 of the resilient region 11 and by the sealing lips 15.

In the variant embodiments according to FIGS. 1, 5, 7a and 7b, the flow channel 14 formed by the sealing lip 15 is surrounded by an outer channel 18, which is defined, over the entire sensor base member 1', by the edges 117 of the nonresilient region 10 and by the sealing lips 15. These edges 117 of the nonresilient region 10 may also be denoted spacers 117 or reference plane webs 117. In FIG. 1 these spacers 117 are the webs projecting at two opposing ends of the nonresilient member 10 into the region of the resilient region 11, i.e. of the base member 1'. With their peripheral housing surface they form a reference plane 217. In FIG. 2 these spacers are shown in the form of surrounding housing edge webs 117. The spacers 117 do not have to be arranged in surrounding manner. It is sufficient for them to be configured so as to produce a surface plane 217 defined relative to the channel bed 141, which surface plane lies lower than the sealing lips 15 projecting therebeyond.

In FIG. 5 there is shown by way of example in the vicinity of a port 101 at two opposing points the resilient web of the resilient region 11 provided in the other figures with reference numeral 17 and the nonresilient web of the nonresilient housing part 10 provided in the other figures with reference numeral 117.

Figure 7A:
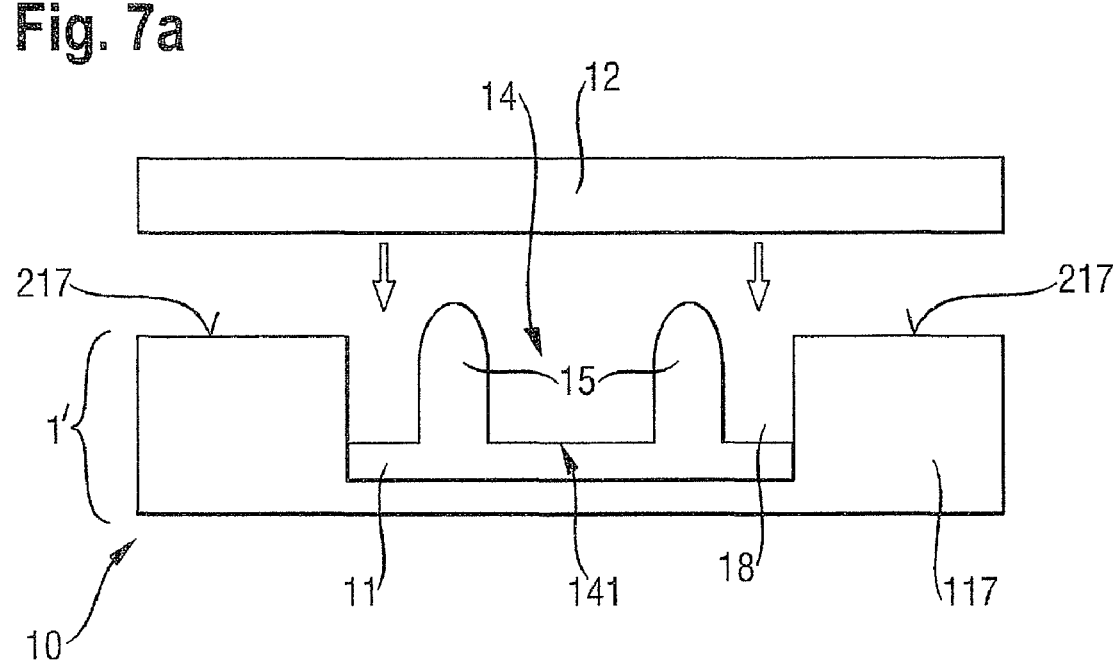
FIG. 7a shows a cross-sectional diagram, which schematically represents a cross-section through a region of the flow channel according to a further variant embodiment across the flow direction, with the cover plate not as yet attached to the base member.
Figure 7B:
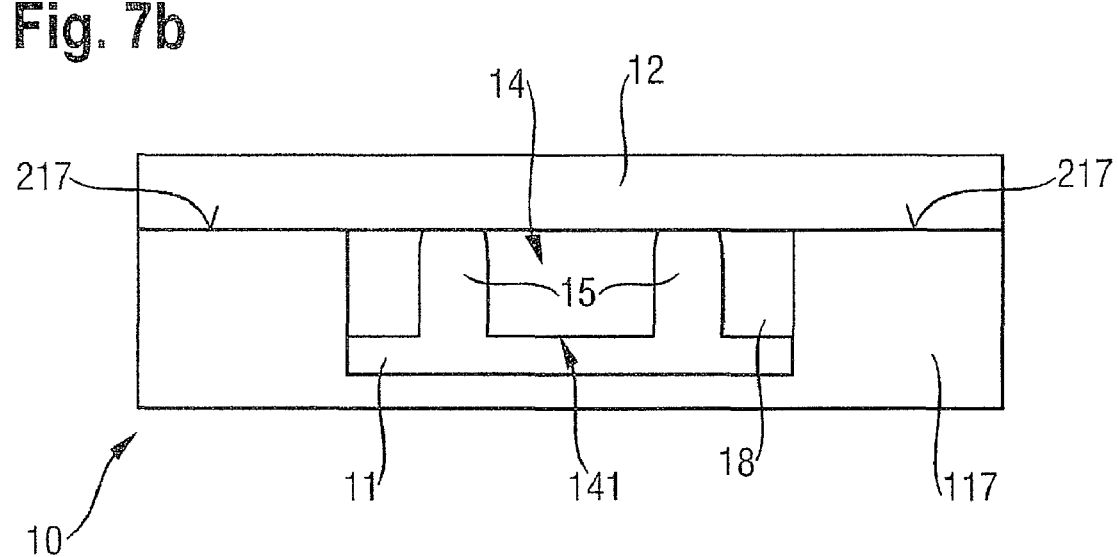
FIG. 7b shows a cross-sectional diagram, which schematically represents a cross-section through the region of the flow channel according to a further variant embodiment across the flow direction, with the cover plate mounted on the base member.

As may in particular be seen in FIGS. 7a and 7b, the nonresilient spacers 117 define a reference plane 217 which is lower, relative to the channel bed 141, than the sealing lips 15 projecting therebeyond. It is thus clearly apparent that, when the cover plate 12 is lowered, the sealing lips 15 are compressed very simply in a defined manner, such that a defined sealing surface is produced which bounds the channel 14 on all sides. To this end it is advantageous with regard to the sealing lips 15 for the cavities 18 to remain, so that the sealing lips 15 have the necessary space to adopt their final position. By using two nonresilient sheet materials 10 and 12, which meet in a defined manner in the region of the surface 217, it is straightforwardly possible to obtain a very long channel route 14, i.e. a high aspect ratio, by a meandering arrangement. The curved shape of the channel implied by the term "meandering" improves laminar flow. It would however also be possible to arrange a plurality of channels 14 directly next to one another and to bring about deflection at one side by way of a more or less U-shaped 180° deflection.

Figure 6:
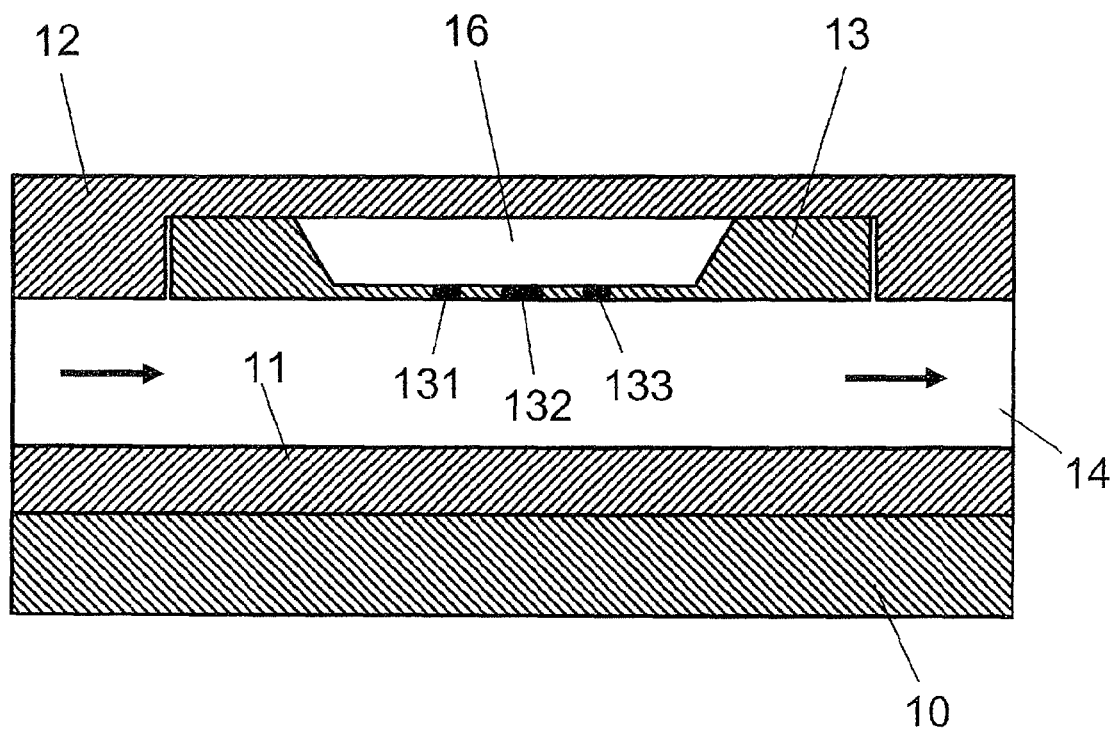
FIG. 6 shows a cross-sectional diagram, which schematically represents a cross-section through a region of the flow channel in the flow direction, in which region the flow sensor element is arranged.

As is illustrated schematically in FIGS. 1 and 6, the flow sensor 1 comprises a flow sensor element 13, which is set into the cover plate 12 and adjoins the flow channel 14. The flow sensor element 13 is set flush into the cover plate 12, such that the cover plate 12 and the flow sensor element 13 form a substantially flat surface for covering the flow channel 14, in order to prevent eddy formation and turbulence. Preferably, the flow sensor element 13 is adhesively bonded to the cover plate 12, but other attaching means are possible, for example screws or snap closures. FIG. 6 shows a cross-section through a part of the flow channel 14 in the flow direction, illustrating an example of a flush arrangement of the flow sensor element 13 in the cover plate 12. The flow sensor element 13 comprises a thinned area, which forms a cavity 16 between the flow sensor element 13 and the cover plate 12. The flow sensor element 13 is an element produced by thin or thick film technology, which comprises a plurality of sensor elements, for example at least one or two temperature sensors 131, 133, or a differential temperature sensor and a heating element 133. It is also possible to use one of the temperature sensors 131, 133 as a heating element. It should be added at this point that the medium temperature may be detected both in the flow channel 14 and on the electronic printed circuit board of the cover plate 12, since the medium adopts the housing temperature of the flow sensor 1 due to the very slight flow in the flow channel 14, i.e. in one variant embodiment the temperature sensor for determining the medium temperature is arranged outside the flow channel 14 on the cover plate 12. The sensor elements 131, 132, 133 of the flow sensor element 13 are connected via strip conductors to an electronic circuit fixed to the cover plate 12. For evaluation of the sensor signals supplied by the sensor elements 131, 132, 133, the electronic circuit preferably comprises a programmable processor, in particular a PSoC (Programmable System on Chip) with integral programmable analog components (amplifier, A-D converter, etc). Either the heat transfer from the heating element 132 to one of the temperature sensors 133 or cooling of the heating element 132 by the medium flowing past is measured, in order on the basis thereof to determine flow velocity and thereby the flow in the flow channel 14.

Figure 8:
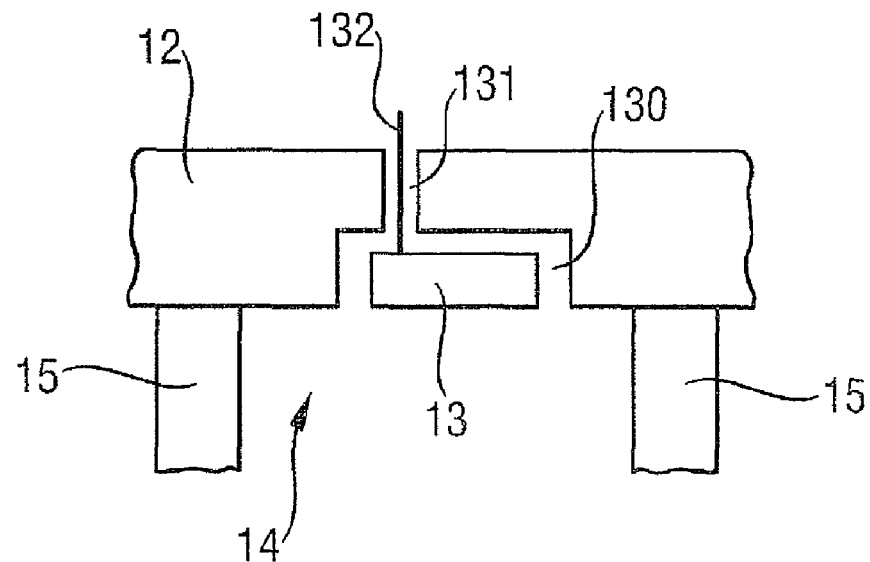
FIG. 8 shows a cross-sectional diagram, which schematically shows a cross-section through the region of a cover plate with set-in flow sensor element and with a signal leadthrough passing through the cover plate.

The signal leadthrough may be embodied for example in the manner illustrated in FIG. 8. The cover plate 12 has a cavity 130, into which the flow sensor element 13 with one or more sensors is set, as explained with reference to FIG. 6. A signal leadthrough 132 passing through the cover plate 12 in a corresponding channel 131 is shown. Since the flow sensor element 13 is preferably enclosed in the cavity 130 by means of sealing filler material, the flow channel 14, which is defined, as is indicated schematically, at the sides by the sealing lips 15 and (not shown) by the channel bed 141, is sealed off very effectively, so as to be able to measure even small pressure differences effectively, for example.

Figure 9:
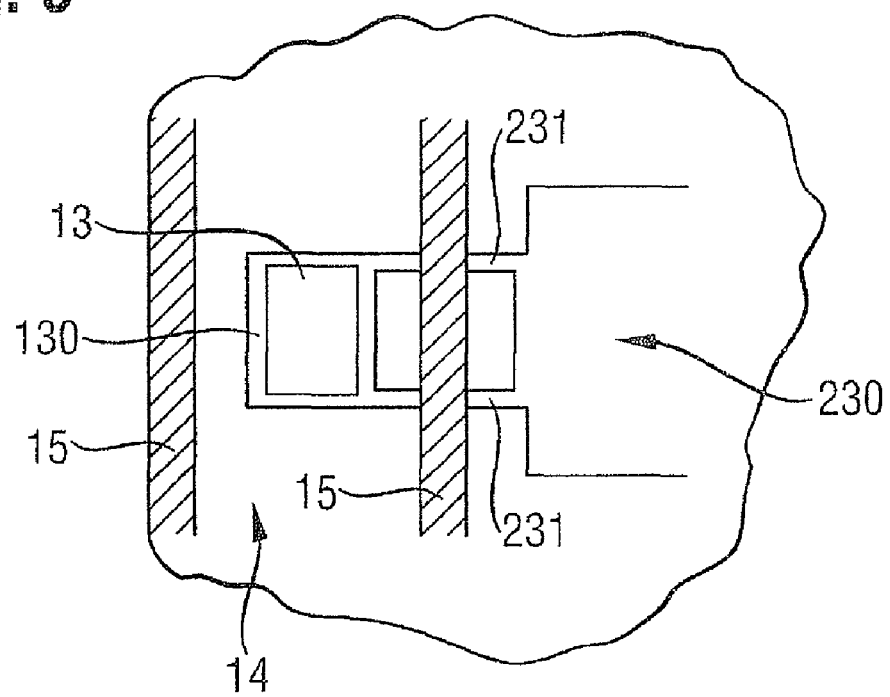
FIG. 9 shows a view from below, which schematically shows a cover plate from below in the region of a flow channel with sealing lips shown in cross-section and with set-in flow sensor element with signal leadthroughs leading laterally to a further region of the cover plate.

FIG. 9 shows a view from below of a different signal leadthrough embodiment, which is particularly advantageous in the case of a single-sided printed circuit board 12. The flow sensor element 13 is set into a cavity in the printed circuit board 12. At least one, and advantageously two separate signal leadthrough grooves 231 are provided in the printed circuit board, in which signal leadthrough grooves signal conductors are guided in the form of cables or foils into a region 230 of the printed circuit board 12 for further processing in electronic components provided therein. The cavities 130 and 231 are here filled with a sealing material, such that the leadthrough does not impair functioning of the sensors below the sealing lip 15.

It is thus clear that, with a nonresilient base member with spacers 117 and an inserted or injection-molded-in resilient region 11, a plurality of fluid channels 14 may be produced for a flow sensor, since these fluid channels are in each case defined on three sides (reference numerals 15, 141 and 15) and sealing may be ensured in a very simple manner by a nonresilient cover plate 12 to be placed thereon. Particularly advantageous is the use of a printed circuit board as cover plate 12, since this is nonresilient and may additionally be provided directly with electronic units for evaluation, resulting in a very compact component. Use of a smooth printed circuit board 12 as a counterpart to the resilient sealing lips 15 allows any desired defined curving and meandering form of the fluid channel, such that a high aspect ratio may be produced with the smallest possible space, without jeopardizing laminar flow.

In principle it is also possible to ensure, by corresponding surface configuration of cover plate 12 and webs 117, that a defined spatial position of cover plate 12 and base member 1/1' is achieved, such that the sensor element 13 and electrical terminals come to lie at predetermined locations.

Although FIGS. 7a and 7b in each case show two sealing lips 15, FIG. 6 shows that, when the resilient region 11 is appropriately configured, with fluid ports through the bottom, in actual fact only a single toroidal sealing lip 15 is present, which fully defines the sides of the fluid channel 14.

Figure 10:
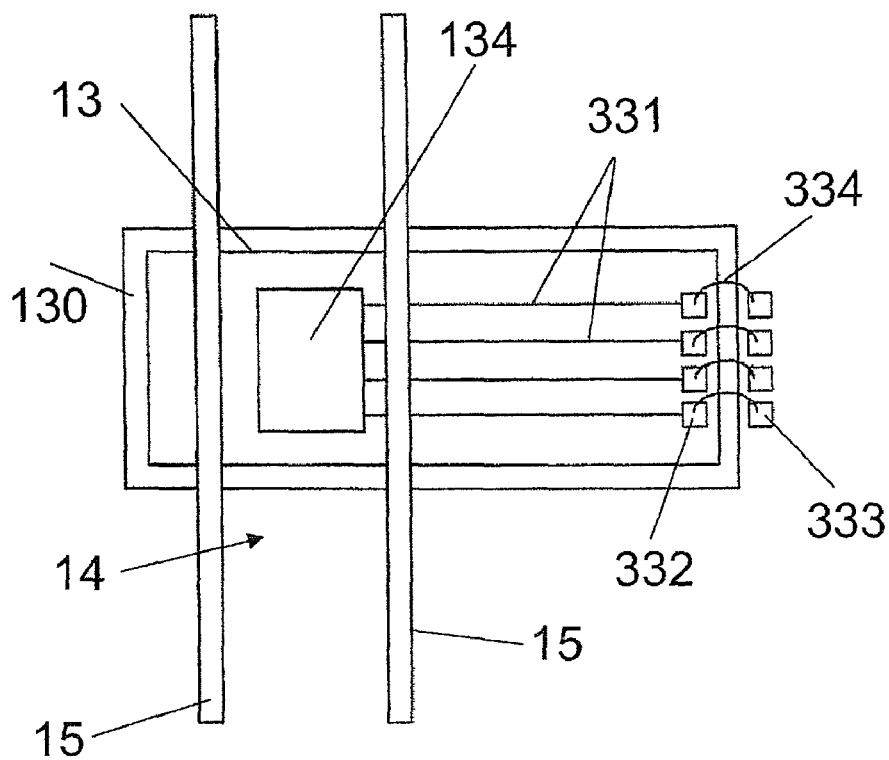
FIG. 10 shows a view from below, which schematically shows a cover plate from below in the region of a flow channel with sealing lips shown in cross-section and with set-in flow sensor element with active sensor surface and with signal leadthroughs leading laterally to a further region of the cover plate.

FIG. 10 shows a further exemplary embodiment of the signal leadthrough in a view from below, which is advantageous in particular in the case of a single-sided printed circuit board 12. The flow sensor element 13 is set into a cavity in the printed circuit board 12. The active sensor surface has been given reference numeral 134, in order to refer to individual sensors, as in FIG. 6. The flow sensor element 13 thus comprises its own printed circuit board, on which at least two, here four separate signal lines 331 are provided, which end in contact surfaces 332 of the sensor element 13. These contact surfaces 332 of the sensor element 13 lie opposite contact surfaces 333 of the cover plate 12, from which signal lines which are not shown are conventionally continued.

Figure 11:
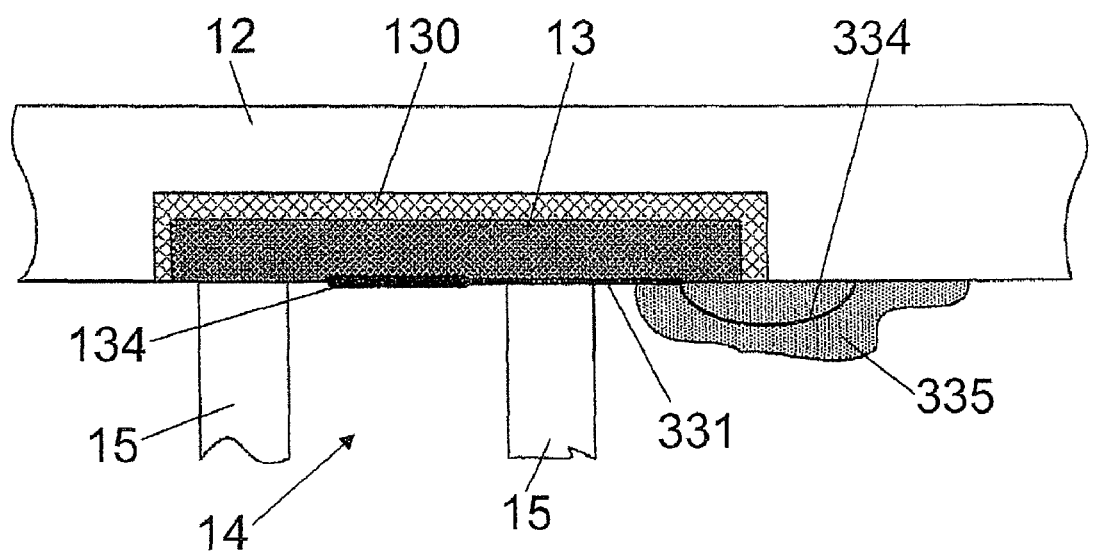
FIG. 11 shows a cross-sectional diagram, which schematically shows a cross-section through the region of the cover plate with set-in flow sensor element with signal leadthrough passing through the cover plate, according to FIG. 10.

The connections between the contact surfaces 332 and 333 are provided by bonding wires 334, which are protected in the side view of FIG. 11 with a casting compound 335. In the exemplary embodiment of FIGS. 10 and 11 the sensor element 13 is thus larger than the width of the channel 14, but the surface 134 active as a sensor is only a part thereof. In a further part of the sensor element 13 the signal lines are passed through under one of the sealing lips 15.

It would also be possible to arrange the active surface 134 more centrally and to pass a further part, inactive with regard to the circuit, of the sensor element 13 through under the other sealing lip. Greater symmetry is traded off against the additional sealing channels of the filling compound 130.

The junction with the cover plate or printed circuit board 12 is here obtained by bonding. The bonding wires 334 are finally also protected by a casting compound 335.

The invention claimed is:
1. A flow sensor, comprising:
    a base member with a flow channel, the base member having a first and a second region joined together, each region consisting of a different material, the first region consisting of a significantly more resilient material than the second region;
    a flow sensor element adjoining the flow channel; and
    a cover plate arranged on the base member and covering the flow channel, the flow channel being formed in the first region of the base member by a compressible sealing lip, which surrounds and defines the flow channel on the top of the base member facing the cover plate and is pressed sealingly against the cover plate,
    wherein the second region of the base member is configured in such a way that a surface plane is obtained which is defined relative to a channel bed of the flow channel and which lies between the plane of the channel bed and the sealing lips projecting therebeyond.
2. The flow sensor as claimed in claim 1, wherein the base member comprises ports formed in the second region for a flow medium, which ports are in each case connected to one of the ends of the flow channel by way of a bore.

3. The flow sensor as claimed in claim 2, wherein the flow sensor element is set into a recess in the cover plate above the flow channel and, with the cover plate, forms a substantially flat ceiling for the flow channel, and wherein an insulating filler material fills the remaining recess level with the cover plate.

4. The flow sensor as claimed in claim 3, wherein at least one groove is provided in the cover plate substantially across the fluid channel direction, which groove leads out of the flow channel through under the sealing lip when the flow sensor is closed, to accommodate a signal conductor.

5. The flow sensor as claimed in claim 3, wherein the recess is configured in the cover plate such that it leads laterally out of the flow channel under at least one of the sealing lips when the flow sensor is closed, wherein a sensor element with at least one active sensor surface is accommodated in the recess, and wherein the sensor element has signal conductors which extend between the at least one active sensor surface and the space next to the sealing lips for leadthrough of the signal.

6. The flow sensor as claimed in claim 1, wherein the flow sensor element is set into a recess in the cover plate above the flow channel and, with the cover plate, forms a substantially flat ceiling for the flow channel, and wherein an insulating filler material fills the remaining recess level with the cover plate.

7. The flow sensor as claimed in claim 6, wherein at least one groove is provided in the cover plate substantially across the fluid channel direction, which groove leads out of the flow channel through under the sealing lip when the flow sensor is closed, to accommodate a signal conductor.

8. The flow sensor as claimed in claim 6, wherein the recess is configured in the cover plate such that it leads laterally out of the flow channel under at least one of the sealing lips when the flow sensor is closed, wherein the sensor element with at least one active sensor surface is accommodated in the recess, and wherein the sensor element has signal conductors which extend between the at least one active sensor surface and the space next to the sealing lips for lead through of the signal.

9. The flow sensor as claimed in claim 1, wherein the sealing lip tapers at the end remote from the top of the base member when the cover plate is removed.

10. The flow sensor as claimed in claim 1, wherein the flow channel is formed on a channel bed on the top of the base member in such a way that the flow channel is separated in cross-section in each case laterally from an outer channel surrounding the flow channel by the sealing lips projecting upwards from the channel bed.

11. The flow sensor as claimed in claim 1, wherein the flow channel on the top of the base member is formed so as to take a repeatedly meandering path, with smooth defining surfaces and a constant cross-section, and brings about laminar flow through the flow channel.

12. A method for the production of a flow sensor, comprising:
 providing a base member with a flow channel,
 arranging a flow sensor element adjoining the flow channel, and
 covering the flow channel by attaching a cover plate to the base member,
 wherein the base member is produced by means of injection molding in such a way that a compressible sealing lip is formed on the top of the base member facing the cover plate, which sealing lip surrounds and defines the flow channel on the top of the base member and presses sealingly against the cover plate when the cover plate is attached to the base member,
 wherein the base member is formed by a two-component injection molding method such that the base member is formed with a first and a second region, which consist in each case of a different material and are joined together,
 wherein the flow channel is formed in the first region, which consists of a significantly more resilient material than the second region, and
 wherein the second region is configured in such a way that a surface plane is obtained which is defined relative to a channel bed of the flow channel and which lies between the plane of the channel bed and the sealing lips projecting therebeyond.

13. The method as claimed in claim 12, wherein the flow sensor element is set into the cover plate in such a way that it comes to lie over the flow channel when the cover plate is attached and, with the cover plate, forms a substantially flat ceiling for the flow channel.

\* \* \* \* \*